US012154438B2

(12) United States Patent
Yamada et al.

(10) Patent No.: US 12,154,438 B2
(45) Date of Patent: Nov. 26, 2024

(54) FLIGHT VEHICLE MANAGEMENT APPARATUS

(71) Applicant: NTT DOCOMO, INC., Tokyo (JP)

(72) Inventors: Takefumi Yamada, Tokyo (JP); Youhei Oono, Tokyo (JP); Yuichiro Segawa, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 841 days.

(21) Appl. No.: 17/043,930

(22) PCT Filed: Mar. 25, 2019

(86) PCT No.: PCT/JP2019/012467
§ 371 (c)(1),
(2) Date: Sep. 30, 2020

(87) PCT Pub. No.: WO2019/194005
PCT Pub. Date: Oct. 10, 2019

(65) Prior Publication Data
US 2021/0125505 A1    Apr. 29, 2021

(30) Foreign Application Priority Data
Apr. 5, 2018 (JP) .................... 2018-073046

(51) Int. Cl.
*G08G 5/00*   (2006.01)
*B64F 1/36*   (2024.01)
(Continued)

(52) U.S. Cl.
CPC ............ *G08G 5/003* (2013.01); *B64F 1/36* (2013.01); *G08G 5/0013* (2013.01);
(Continued)

(58) Field of Classification Search
CPC ... G08G 5/00; B64F 1/00; H04B 7/00; H04W 48/00; H04W 4/00; B64U 2201/00; B64C 39/00
See application file for complete search history.

(56) References Cited

U.S. PATENT DOCUMENTS 6,865,215 B1 * 3/2005 Russell ................ H04B 7/2621
   375/135
8,630,636 B2 * 1/2014 Eguchi ................ H04W 72/541
   455/67.11
(Continued)

FOREIGN PATENT DOCUMENTS

JP    2004503843 A    2/2004
WO    2016175934 A1   11/2016

OTHER PUBLICATIONS

Office Action issued by the Japanese Patent Office in corresponding Japanese Patent Application No. 2020-511704, dated Feb. 7, 2023; 5 pages.
(Continued)

Primary Examiner — Aniss Chad
Assistant Examiner — Elizabeth J Slowik
(74) Attorney, Agent, or Firm — DILWORTH IP, LLC

(57) ABSTRACT

The present invention suppresses the case where communication performed by a radio communication apparatus of one flight vehicle is negatively influenced in the case where the radio communication apparatus of the one flight vehicle is connected to a radio base station that is experiencing interference due to a radio communication apparatus of another flight vehicle. A distance specification unit specifies, for each airspace, a distance between a first flight vehicle and a second flight vehicle that has a radio communication apparatus and is located in a cell formed by a radio base station that is experiencing interference due to a radio communication apparatus of the first flight vehicle. An
(Continued)

instruction unit instructs, in each airspace, the first flight vehicle and the second flight vehicle to maintain the distance specified for the airspace by the distance specification unit when flying.

7 Claims, 4 Drawing Sheets

(51) Int. Cl.
    *B64U 101/20*     (2023.01)
    *H04B 7/185*     (2006.01)
    *H04W 48/04*     (2009.01)

(52) U.S. Cl.
    CPC ........ *H04B 7/18506* (2013.01); *H04W 48/04* (2013.01); *B64U 2101/20* (2023.01)

(56) References Cited

U.S. PATENT DOCUMENTS

| | | | |
|---|---|---|---|
| 10,505,622 B1* | 12/2019 | Stein | H04L 65/611 |
| 2002/0032528 A1 | 3/2002 | Lai | |
| 2010/0210214 A1* | 8/2010 | Pawar | H04W 72/541 |
| | | | 455/63.1 |
| 2015/0142211 A1* | 5/2015 | Shehata | G08G 5/0069 |
| | | | 701/2 |
| 2018/0095155 A1* | 4/2018 | Soni | G08G 5/0013 |
| 2019/0058523 A1* | 2/2019 | Wu | H04B 17/318 |
| 2019/0283871 A1* | 9/2019 | Wieczorek | B64C 39/024 |
| 2019/0327007 A1* | 10/2019 | Wang | H04J 11/0023 |
| 2020/0077321 A1* | 3/2020 | Shi | H04W 48/02 |
| 2020/0100187 A1* | 3/2020 | Balasubramanian | H04L 1/001 |
| 2020/0236573 A1* | 7/2020 | Zhang | H04W 76/27 |
| 2020/0245174 A1* | 7/2020 | Lu | H04W 24/10 |
| 2020/0320886 A1* | 10/2020 | Zhou | G08G 5/0069 |

OTHER PUBLICATIONS

International Search Report issued in corresponding PCT Application No. PCT/JP2019/012467 dated May 10, 2019, 2 pages.

"LTE; Evolved Universal Terrestrial Radio Access (E-UTRA); Physical layer procedures", (3GPP TS 36.213 version 14.2.0 Release 14), Apr. 2017, http://www.etsi.org/standards-search, France, 456 pages.

* cited by examiner

ID="1" />
FLIGHT VEHICLE MANAGEMENT APPARATUS

TECHNICAL FIELD

The present invention relates to technology for controlling the flight of a flight vehicle.

BACKGROUND

In order to achieve faster speeds than in Long Term Evolution (LTE), the 3rd Generation Partnership Project (3GPP) has created the LTE-Advanced (hereinafter, the term "LTE" includes LTE-Advanced) standard. The 3GPP is also reviewing specifications for a system called 5G (5th generation mobile communication system) or the like as a successor to LTE.

Under LTE, it is defined that the transmit power of a physical uplink channel is controlled based on the path loss between a radio base station (eNB) and a radio communication apparatus (UE). Specifically, it is defined that the transmit power of the physical uplink shared channel (specifically, PUSCH: Physical Uplink Shared Channel) is controlled based on the path loss of the physical downlink channel (e.g., see 1; 3GPP TS 36.213 V14.2.0 Subclause 5.1.1 Physical uplink shared channel, 3rd Generation Partnership Project; Technical Specification Group Radio Access Network; Evolved Universal Terrestrial Radio Access (E-UTRA); Physical layer procedures (Release 14).1

There are also radio communication apparatuses (hereinafter called specified radio communication apparatuses) that carry out communication in the sky, where the line-of-sight is good in all directions, rather than on the ground, as with radio communication apparatuses provided in unmanned flight vehicles called drones.

With such specified radio communication apparatuses, the path loss of the physical downlink channel is smaller because the line-of-sight is good. Also, a specified radio communication apparatus is highly likely to carry out communication at a position where it is possible to detect multiple cells in which the aforementioned path loss is small. In other words, because a specified radio communication apparatus has a good line-of-sight, a radio base station that forms a cell that does not include the specified radio communication apparatus (i.e., an out-of-zone cell) may in some cases receive a signal having a very high signal level from the specified radio communication apparatus.

Current LTE specifications do not envision such communication performed in the sky by specified radio communication apparatuses. For this reason, based on the premise that a radio communication apparatus is located close to a radio base station if the aforementioned path loss is small, a high target reception quality (specifically a Target SIR) will be set in order to improve throughput. In order to satisfy a high set target reception quality, a radio communication apparatus generally executes control to raise the PUSCH transmit power.

However, when such control is executed in a specified radio communication apparatus, there is a possibility of causing interference in the cell that the specified radio communication apparatus is connected to, or neighboring cells formed in the vicinity of that cell. In other words, a specified radio communication apparatus, which has a good line-of-sight in all directions due to carrying out communication in the sky, has a higher possibility of causing interference in its own cell and neighboring cells than a normal radio communication apparatus that carries out communication on the ground for example. Furthermore, because a specified radio communication apparatus has a good line-of-sight with multiple neighboring radio base stations, the reception power is high for all of the physical downlink channels from the radio base stations. For this reason, communication may be negatively influenced if the specified radio communication apparatus of one flight vehicle is connected to a radio base station that is experiencing interference due to the specified radio communication apparatus of another flight vehicle.

SUMMARY OF INVENTION

The present invention is achieved in light of the foregoing circumstances, and an object of the present invention is to suppress the case where communication performed by the radio communication apparatus of one flight vehicle is negatively influenced in the case where the radio communication apparatus of the one flight vehicle is connected to a radio base station that is experiencing interference due to the radio communication apparatus of another flight vehicle.

In one aspect, the present invention provides a flight vehicle management apparatus including: a distance specification unit configured to specify, for an airspace, a distance between a first flight vehicle and a second flight vehicle that has a second radio communication apparatus and is located in a cell formed by a radio base station that is experiencing interference due to a first radio communication apparatus of the first flight vehicle; and an instruction unit configured to, in the airspace, instruct the first flight vehicle and the second flight vehicle to maintain the distance specified for the airspace by the distance specification unit when flying.

An aspect is possible in which the distance specification unit includes a first specification unit configured to specify, for a location, a parameter regarding a communication quality of the first radio communication apparatus in a cell formed by a radio base station, a second specification unit configured to specify one or more radio base stations for which the parameter specified by the first specification unit is in a predetermined range at a certain location, a third specification unit configured to specify an interference radio base station that is, among the one or more radio base stations specified by the second specification unit, a radio base station other than a radio base station that is connected to the first radio communication apparatus of the first flight vehicle that is flying at the certain location, a fourth specification unit configured to specify a location at which the second radio communication apparatus is connectable to the interference radio base station specified by the third specification unit, and a fifth specification unit configured to specify a distance between the certain location and the location specified by the fourth specification unit, as the distance between the first flight vehicle and the second flight vehicle.

An aspect is possible in which when the distance between the first flight vehicle and the second flight vehicle is less than or equal to a threshold value, the instruction unit does not give an instruction to maintain the distance specified by the distance specification unit when flying.

An aspect is possible in which when the first flight vehicle is a flight vehicle having the first radio communication apparatus includes a function for avoiding interference with the radio base station, the instruction unit does not give an instruction to maintain the distance specified by the distance specification unit when flying.

An aspect is possible in which in a case of a flight vehicle having a radio communication apparatus that does not need to perform communication using a physical uplink channel or a flight vehicle having a communication apparatus that does not perform communication via the radio base station, the instruction unit does not give an instruction to maintain the distance specified by the distance specification unit when flying.

According to the present invention, it is possible to suppress the case where communication performed by the radio communication apparatus of one flight vehicle is negatively influenced in the case where the radio communication apparatus of the one flight vehicle is connected to a radio base station that is experiencing interference due to the radio communication apparatus of another flight vehicle.

DETAILED DESCRIPTION

Figure 1:
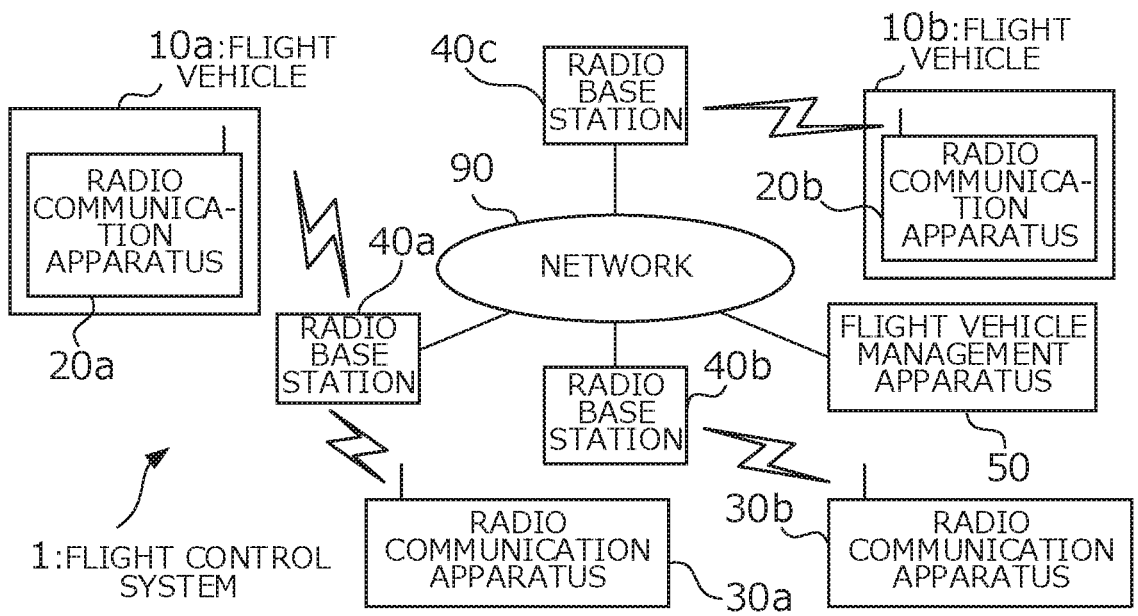
FIG. 1 is a block diagram showing an example of the configuration of flight control system 1, in accordance to the present invention.

FIG. 1 is a diagram showing an example of the configuration of flight control system 1. Flight control system 1 includes multiple flight vehicles 10a and 10b that are drones or the like, multiple radio communication apparatuses 20a and 20b that are provided in flight vehicles 10a and 10b, multiple radio communication apparatuses 30a and 30b for use by users on the ground, network 90 that includes radio base stations 40a, 40b, and 40c, and flight vehicle management apparatus 50 that is connected to network 90. Note that hereinafter, flight vehicles 10a and 10b will be collectively called flight vehicles 10, radio communication apparatuses 20a and 20b will be collectively called radio communication apparatuses 20, radio communication apparatuses 30a and 30b will be collectively called radio communication apparatuses 30, and radio base stations 40a, 40b, and 40c will be collectively called radio base stations 40.

Each flight vehicle 10 physically includes a computer, various sensors controlled by the computer, and a drive mechanism that includes motors, rotor blades, and the like, and the computer includes a CPU (Central Processing Unit), a ROM (Read Only Memory), a RAM (Random Access Memory), and an auxiliary storage apparatus, as well as a positioning unit for measuring the position of the flight vehicle, a communication IF (Interface) for connection to radio communication apparatuses 20, and the like. Flight vehicle 10 flies in the air by the computer controlling the drive mechanism in accordance with a flight plan or the like that has been assigned to flight vehicle 10 and includes airspace positions, passage times for such positions, and the like. Note that flight vehicle 10 need only being a flying apparatus, and is also called a UAS (Unmanned Aircraft System), for example.

A radio communication system is constructed by network 90 that includes radio communication apparatuses 20 and 30 and radio base stations 40. This radio communication system is a radio communication system that complies with LTE (Long Term Evolution) standards, for example. In LTE, radio communication apparatuses 20 and 30 are called UEs, and radio base stations 40 are called eNBs. The areas where radio communication can be performed with radio base stations 40 are called cells. Radio communication apparatuses 20 and 30 that are located in (in the zone of) a cell perform radio communication with radio base station 40 that forms that cell. For example, radio communication apparatus 30 used by a user located on the ground executes radio communication with radio base station 40 located on the ground. On the other hand, radio communication apparatus 20 provided in flight vehicle 10 executes radio communication with radio base station 40 both when on the ground and when in the air (e.g., an airspace with an altitude of 30 m or more).

Flight vehicle management apparatus 50 is an information processing apparatus that controls and manages the flight of flight vehicles 10. In the present embodiment, flight vehicle management apparatus 50 has a feature in processing for instructing a distance to be maintained between flight vehicles 10. Note that functions in flight vehicle operation control are generally distributed among multiple systems such as an FIMS (Flight Information Management System) and a UASSP (UAS Service Provider), and flight vehicle management apparatus 50 of present embodiment may be implemented using such systems, or may be implemented using any one of such systems. Also, some of the functions of flight vehicle management apparatus 50, such as the functions of later-described specification unit (airspace communication state detection function), may be implanted using an apparatus other than a general FIMS or UASSP.

Figure 2:
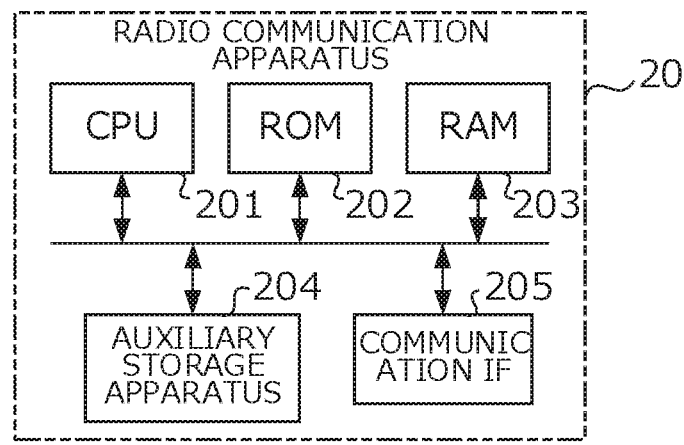
FIG. 2 is a block diagram showing the hardware configuration of radio communication apparatuses 20, in accordance to the present invention.

FIG. 2 is a block diagram showing the hardware configuration of radio communication apparatus 20. The radio communication apparatus 20 includes at least CPU 201 (Central Processing Unit), ROM (Read Only Memory) 202, RAM (Random Access Memory) 203, auxiliary storage apparatus 204, and communication IF 205. CPU 201 is a processor that performs various types of computation. ROM 202 is a non-volatile memory that stores a program and data used when radio communication apparatus 20 starts up, for example. RAM 203 is a volatile memory that functions as a work area for when CPU 201 executes programs. Auxiliary storage apparatus 204 is a non-volatile storage apparatus such as an HDD (Hard Disk Drive) or an SSD (Solid State Drive), and stores programs and data used in radio communication apparatus 20. Communication IF 205 is an interface for performing communication via network 90 in compliance with LTE. Note that besides the constituent elements illustrated in FIG. 2, radio communication apparatus 20 may include other constituent elements such as a display unit, an operation unit, or an audio input/output unit. Also, the hardware configuration of radio communication apparatus 30 is similar to that of radio communication apparatus 20, and therefore will not be described.

Figure 3:
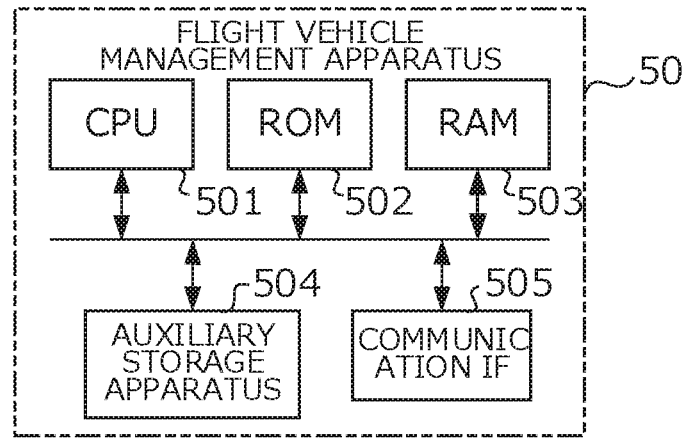
FIG. 3 is a block diagram showing the hardware configuration of flight vehicle management apparatus 50, in accordance to the present invention.
Figure 5:
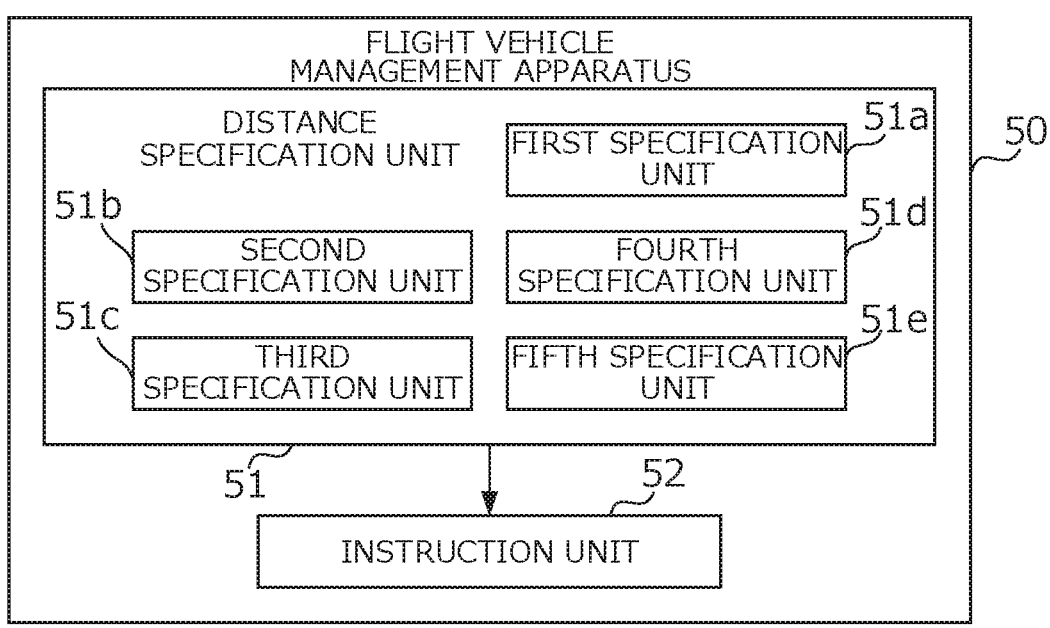
FIG. 5 is a block diagram showing the functional configuration of flight vehicle management apparatus 50, in accordance to the present invention.

FIG. 3 is a diagram showing the hardware configuration of flight vehicle management apparatus 50. Flight vehicle management apparatus 50 is a computer apparatus that includes CPU 501, ROM 502, RAM 503, auxiliary storage apparatus 504, and communication IF 505. CPU 501 is a processor that performs various types of computation. ROM 502 is a non-volatile memory that stores a program and data used when flight vehicle management apparatus 50 starts up, for example. RAM 503 is a volatile memory that functions as a work area for when CPU 501 executes programs. Auxiliary storage apparatus 504 is a non-volatile storage apparatus such as an HDD or an SSD, and stores programs and data used in flight vehicle management apparatus 50. Later-described functions shown in FIG. 5 are realized by CPU 501 executing such programs. Communication IF 505 is an interface for performing communication via network 90 in compliance with a predetermined communication standard. Note that besides the constituent elements illustrated in FIG. 3, flight vehicle management apparatus 50 may include other constituent elements such as a display unit or an operation unit.

Figure 4A:
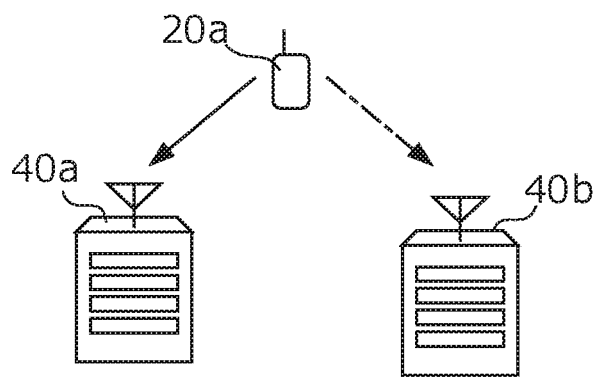
FIG. 4A is a diagram illustrating a cause of interference, in accordance to the present invention.

The following describes communication interference that occurs in the radio communication system. As shown in FIG. 4A, radio communication apparatus 20a is provided in flight vehicle 10 that flies in the air, and therefore has a good line-of-sight to connection-partner radio base station 40a (solid line arrow), and simultaneously has a good line-of-sight to radio base station 40b that is in the vicinity of radio base station 40a (dashed-dotted line arrow).

For this reason, in the case of radio communication apparatus 20a, the path loss of the physical downlink channel from radio base station 40a and the path loss of the physical downlink channel from radio base station 40b are both small. As previously described, under current LTE specifications, if the aforementioned path loss is small, a high Target SIR is set in order to improve the throughput, and radio communication apparatus 20a raises the transmit power of the physical uplink channel in order to satisfy the high Target SIR. Note that the physical uplink channel mentioned here includes not only a PUSCH (Physical Uplink Shared Channel), but also a PUCCH (Physical Downlink Control Channel), and a PRACH (Physical Random Access Channel). Also, the physical uplink channel may be an NPUSCH for an MTC-UE. As a result, radio communication apparatus 20a is a source of interference with radio base station 40b, which is not a connection partner.

In contrast, in the case of radio communication apparatus 30 that executes communication on the ground, even if the path loss of the physical downlink channel from radio base station 40 that is the connection partner is small, it is often the case that the line-of-sight to another radio base station 40 in the vicinity of connection-partner radio base station 40 is not good due to the existence of an obstructing object or the like. In this case, the path loss of the physical downlink channel from non-connection-partner radio base station 40 to radio communication apparatus 30 increases, and therefore the problem of interference described using FIG. 4A is not likely to occur.

Figure 4B:
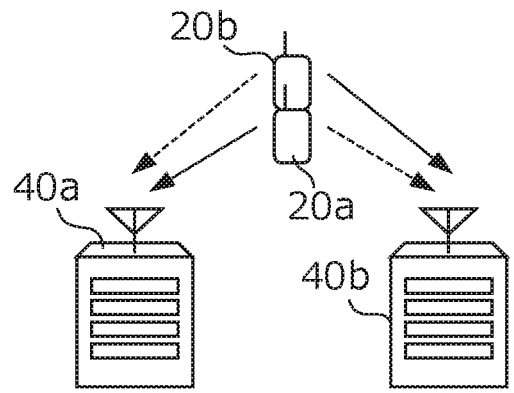
FIG. 4B is a diagram illustrating a cause of interference, in accordance to the present invention.

Also, as shown in FIG. 4B, if radio communication apparatuses 20a and 20b provided in flight vehicles 10 are respectively connected to radio base stations 40a and 40b that are in the vicinity of each other, radio communication apparatuses 20a and 20b both continue to raise the transmit power until the Target SIR is satisfied, and therefore can possibly cause a large amount of interference with each other. Note that in the state shown in FIG. 4B, radio communication apparatus 20a is connected to radio base station 40a (solid line arrow), and radio communication apparatus 20b is connected to radio base station 40b (solid line arrow). Furthermore, in the state shown in FIG. 4B, radio communication apparatus 20a is a source of interference with non-connection-partner radio base station 40b (dashed line arrow), and radio communication apparatus 20b is a source of interference with non-connection-partner radio base station 40a (dashed line arrow).

According to the present embodiment, it is possible to suppress the case where communication performed by radio communication apparatus 20b is negatively influenced in the case where radio communication apparatus 20b is connected to radio base station 40b that is experiencing interference due to radio communication apparatus 20a as described with reference to FIG. 4B.

FIG. 5 is a diagram showing an example of the functional configuration of flight vehicle management apparatus 50. Functions of the flight vehicle management apparatus 50 are realized by CPU 501 executing predetermined software (programs) to perform various types of computation, and controlling communication performed by communication IF 505 and the reading and/or writing of data from/to ROM 502, RAM 503, and auxiliary storage apparatus 504.

In FIG. 5, for each airspace, distance specification unit 51 specifies a distance to be maintained between first flight vehicle 10 and second flight vehicle 10 that has radio communication apparatus 20 and is located in a cell formed by radio base station 40 that is experiencing interference due to radio communication apparatus 20 of first flight vehicle 10. Each airspace is an airspace that has been defined in advance based on a predetermined reference, for example.

Specifically, distance specification unit 51 includes: first specification unit 51a that specifies a parameter regarding the communication quality of radio communication apparatus 20 for each location in cells formed by radio base stations 40; second specification unit 51b that specifies one or more radio base stations 40 for which the parameter specified by first specification unit 51a is in a predetermined range at a certain location; third specification unit 51c that specifies an interference radio base station that is, among the one or more radio base stations 40 specified by second specification unit 51b, radio base station 40 other than radio base station 40 that is connected to radio communication apparatus 20 of flight vehicle 10 that is flying at the certain location; fourth specification unit 51d that specifies a location at which radio communication apparatus 20 can be connected to the interference radio base station that was specified by third specification unit 51c; and fifth specification unit 51e that specifies the distance between the certain location and the location that was specified by the fourth specification unit 51d, as the distance to be maintained between first flight vehicle 10 and second flight vehicle 10.

For each airspace, instruction unit 52 instructs first flight vehicle 10 and second flight vehicle 10 to maintain the distance specified by the distance specification unit 51 for the airspace when flying. Furthermore, instruction unit 52 stores flight plans, and also records identification information and the flight status of each flight vehicle 10 that is under control of flight vehicle management apparatus 50. The flight status includes positions at which the corresponding flight vehicle 10 is flying, and date/times of such positions. These positions and times are transmitted from radio communication apparatus 20 of flight vehicle 10 to flight vehicle management apparatus 50 along with the identification information of flight vehicle 10 via network 90. Instruction unit 52 also determines whether or not the positions and times are within the corresponding flight plans, and, based on the determination result, gives flight instructions to flight vehicles 10 via network 90 as necessary.

Figure 6:
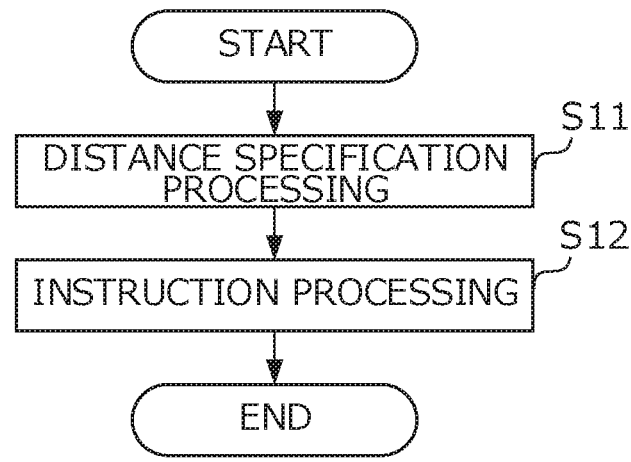
FIG. 6 is a flowchart showing an example of operations of flight vehicle management apparatus 50, in accordance to the present invention.

The following describes operations in the present embodiment. In FIG. 6, for each airspace, distance specification unit 51 specifies the distance to be maintained between first flight vehicle 10 and second flight vehicle 10 that is located in a cell formed by radio base station 40 that is experiencing interference due to radio communication apparatus 20 of first flight vehicle 10 (step S11).

Specifically, first, first specification unit 51a specifies, for each location, a parameter regarding the communication quality of radio communication apparatus 20 in the cell formed by radio base station 40. As previously described, this parameter is the path loss of the physical downlink channel from radio base station 40 to radio communication apparatus 20, for example. As a specific example of a specification method, flight vehicles 10 having radio communication apparatuses 20 are experimentally caused to fly and cover all of the airspaces, such radio communication apparatuses 20 are caused to acquire the path loss of the physical downlink channel in the airspaces, and that information is collected. As another method, a simulation is performed based on the position and size of the cell of each radio base station 40, map information, and a predetermined wave propagation model, and the path loss of the physical downlink channel is measured in each airspace.

Figure 7:
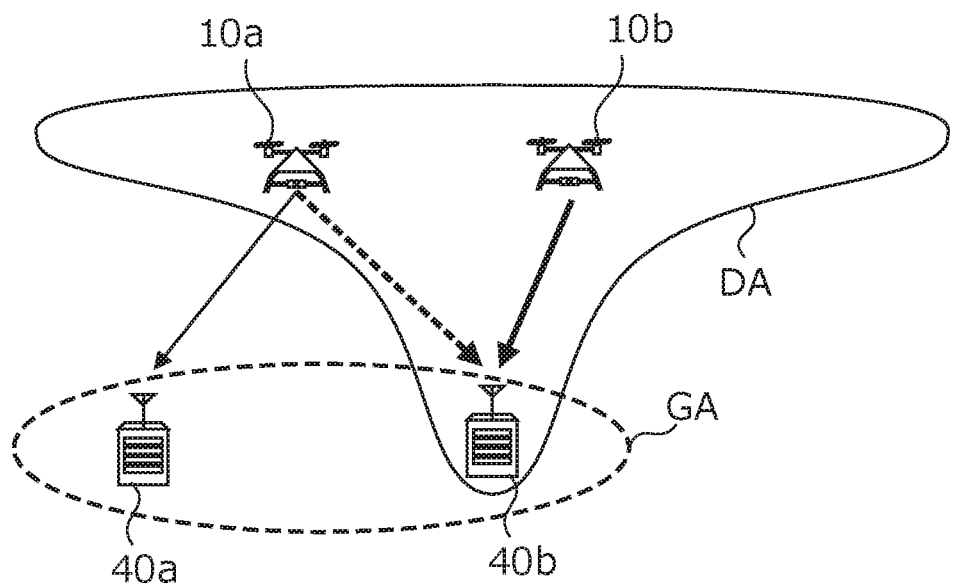
FIG. 7 is a diagram illustrating an example of the positional relationship between radio base stations 40 and radio communication apparatuses 20, in accordance to the present invention.

Next, second specification unit 51b specifies one or more radio base stations 40 for which the parameter specified by first specification unit 51a is in a predetermined range at a certain location. Specifically, second specification unit 51b specifies a ground area that includes one or more radio base stations 40 for which the path loss of the physical downlink channel to radio communication apparatus 20 of flight vehicle 10 is less than or equal to a threshold value. Accordingly, as schematically shown in FIG. 7, second specification unit 51b specifies ground area GA that includes one or more radio base stations 40 for which the path loss of the physical downlink channel to radio communication apparatus 20a of flight vehicle 10a is less than or equal to a threshold value (in the figure, two radio base stations 40a and 40b).

Next, third specification unit 51c specifies an interference radio base station that is, among radio base stations 40 located in ground area GA specified by second specification unit 51b, radio base station 40 other than radio base station 40 that is connected to radio communication apparatus 20 of flight vehicle 10 flying at the certain location. Accordingly, as schematically shown in FIG. 7, out of radio base stations 40a and 40b, radio base station 40b that is not radio base station 40a connected to radio communication apparatus 20a of flight vehicle 10a is specified as the interference radio base station.

Next, fourth specification unit 51d specifies a location at which radio communication apparatus 20 can be connected to the interference radio base station that was specified by third specification unit 51c. Accordingly, as schematically shown in FIG. 7, fourth specification unit 51d specifies area DA, which is a group of locations at which radio communication apparatus 20 can be connected to radio base station 40b, which is the interference radio base station.

Next, based on the certain location and the locations (area DA) specified by fourth specification unit 51d, fifth specification unit 51e specifies a distance (isolation distance) that is to be maintained between first flight vehicle 10 at the certain location and second flight vehicle 10 that is flying in the vicinity of the certain location. Specifically, fifth specification unit 51e specifies the distance between the certain location and the locations (area DA) specified by fourth specification unit 51d as the distance (isolation distance) that is to be maintained between first flight vehicle 10 at the certain location and second flight vehicle 10 that is flying in the vicinity of the certain location. In this case, area DA is a group of locations, and therefore fifth specification unit 51e may specify the distance between the certain location and each of the locations included in area DA specified by fourth specification unit 51d as the isolation distance, may specify the longest/shortest distance between the certain location and the locations in area DA specified by fourth specification unit 51d as the isolation distance, or may specify the distance between the certain location and a representative location in area DA specified by fourth specification unit 51d (e.g., the centroid location of area DA) as the isolation distance.

Also, the isolation distance may be set by typifying or averaging isolation distances based on attributes and/or the environment of the airspace at the certain location (the altitude of the airspace or the density of ground-based radio base stations 40 that correspond to the airspace). This is because the isolation distance can be set more easily with use of the airspace altitude and the density of radio base stations 40 or the like as parameters, rather than strictly setting an individual isolation distance for each airspace. For example, the isolation distance is set to X1 if the airspace altitude is in a first range (high altitude) and the density of radio base stations 40 (base station density) in ground area GA corresponding to that airspace is in a second range (high density), and the isolation distance is set to X2 if the altitude is in a third range (low altitude) and the base station density is in the second range (low high density). For example, X1>X2 in this case. Also, the isolation distance is set to X3 if the altitude is in the first range (high altitude) and the base station density is in the second range (high density), and the isolation distance is set to X4 if the altitude is in the first range (high altitude) and the base station density is in a fourth range (low density). For example, X3>X4 in this case. Although the case of using the airspace altitude and the density of radio base stations 40 as two parameters is described above, the isolation distance may be set using either one of the parameters, that is to say the airspace altitude or the density of radio base stations 40.

For each airspace, instruction unit 52 instructs first flight vehicle 10 and second flight vehicle 10 to maintain the distance specified by the distance specification unit 51 for the airspace when flying (step S12). At this time, in accordance with desired flight content that was requested in advance by the operators of flight vehicles 10, for each airspace, instruction unit 52 assigns flight vehicles 10 that are to fly in the airspace, and creates flight plans that include flight paths, flight periods, and the like, and the above-described distances are maintained between first flight vehicle 10 and second flight vehicle 10 in the created flight plans.

According to the embodiment described above, it is possible to suppress the case where communication performed by the radio communication apparatus 20 of one flight vehicle 10 is negatively influenced in the case where radio communication apparatus 20 of the one flight vehicle 10 is connected to radio base station 40 that is experiencing interference due to radio communication apparatus 20 of another flight vehicle 10.

Variations

The present invention is not limited to the embodiment described above. The above-described embodiment may be modified as described below. Also, two or more of the following variations may be implemented in combination with each other.

Variation 1

A configuration is possible in which, if the distance between first flight vehicle 10 and second flight vehicle 10 is less than or equal to a threshold value, instruction unit 52 does not give an instruction to maintain the distance specified by distance specification unit 51 when flying. This is because if the distance between first flight vehicle 10 and second flight vehicle 10 is less than or equal to the threshold value, first flight vehicle 10 and second flight vehicle 10 are both connected to the same radio base station 40, and therefore the negative influence shown in FIG. 4B does not occur. Here, instruction unit 52 compares the flight plans of first flight vehicle 10 and second flight vehicle 10, and if the distance between the two flight vehicles 10 at the same time period in the same airspace is less than or equal to the threshold value, instruction unit 52 does not give an instruction to maintain the distance specified by distance specification unit 51 for that airspace when flying.

Variation 2

A configuration is possible in which, if first flight vehicle 10 is a flight vehicle having radio communication apparatus 20 that includes a function for avoiding interference with radio base stations 40, instruction unit 52 does not give an instruction to maintain the distance specified by distance specification unit 51 when flying. Here, "radio communication apparatus 20 having a function for avoiding interference with radio base stations 40" is radio communication apparatus 20 that has any of a function for maintaining the transmit power within a maximum transmit power range that was individually set for radio communication apparatus 20, a function for maintaining the transmit power within a maximum transmit power range that was set for each type of radio communication apparatus 20, and a function for maintaining the transmit power within a maximum transmit power range that changes according to the communication quality of radio communication apparatus 20. As long as the flight vehicle is flight vehicle 10 that includes radio communication apparatus 20 having such a function, even if the flight vehicle is assigned to the interference airspace, the transmit power will not be set excessively high in order to satisfy a high Target SIR, thus suppressing the case where radio base station 40b is negatively influenced by interference waves from radio communication apparatus 20a as shown in the example in FIG. 4B. This will be described in detail below.

Radio base station 40 controls the transmit power of the physical uplink channel used for transmission by radio communication apparatus 20. Specifically, radio base station 40 gives radio communication apparatus 20 instructions regarding the transmit power of the physical uplink channel, and radio communication apparatus 20 controls the transmit power of the physical uplink channel in accordance with the instructions. Note that although the following description is given by way of example of PUSCH, similar control is executed for other channels as well.

Figure 8:
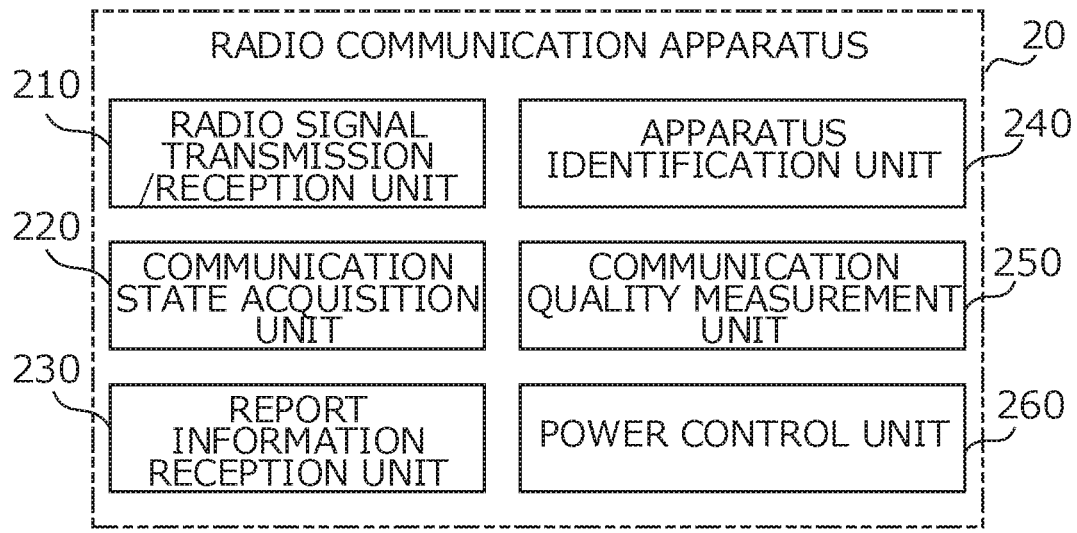
FIG. 8 is a block diagram showing the functional configuration of radio communication apparatus 20 in a variation, in accordance to the present invention.
Figure 9:
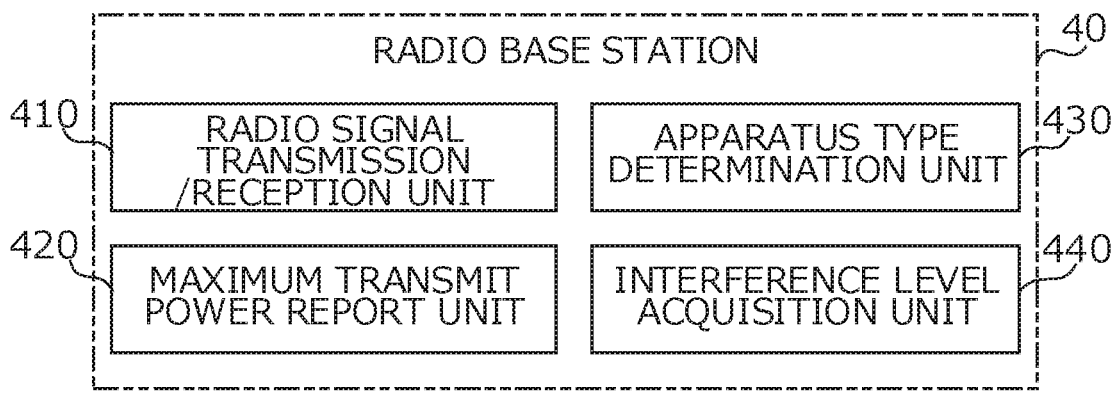
FIG. 9 is a block diagram showing the functional configuration of radio base station 40 in a variation, in accordance to the present invention.

FIG. 8 is a block diagram showing the functional configuration of radio communication apparatus 20 having the above-described function. FIG. 9 is a block diagram showing the functional configuration of radio base station 40 in Operation Example 1. As shown in FIG. 8, radio communication apparatus 20 includes radio signal transmission/reception unit 210, communication state acquisition unit 220, report information reception unit 230, apparatus identification unit 240, communication quality measurement unit 250, and power control unit 260.

Radio signal transmission/reception unit 210 exchanges radio signals with radio base station 40. Specifically, radio signal transmission/reception unit 210 performs transmission and reception on various types of physical channels (control channels and shared channels) in compliance with the LTE standard.

Communication state acquisition unit 220 acquires the communication state of the radio communication system, which includes the reception state of radio communication apparatus 20. Specifically, communication state acquisition unit 220 acquires the interference levels in a group of cells that includes the cell of radio base station 40 to which radio communication apparatus 20 is connected. More specifically, communication state acquisition unit 220 acquires this interference level from radio base station 40 to which radio communication apparatus 20 is connected. Communication state acquisition unit 220 also acquires a parameter regarding the communication quality of radio communication apparatuses 20 in the group of cells. Specifically, communication state acquisition unit 220 acquires the path loss of the physical downlink channel to radio base station 40 to which radio communication apparatus 20 is connected, as well as radio base stations 40 in the vicinity thereof. Note that communication state acquisition unit 220 may acquire the RSRP (Reference Signal Received Power), which can be a determination index similar to the path loss, for example.

Report information reception unit 230 receives report information via connection-partner radio base station 40, for example. Specifically, report information reception unit 230 receives an RRC message that includes an MIB (Master Information Block) and an SIB (System Information Block) from radio base station 40. For example, report information reception unit 230 acquires the "type maximum value" of the transmit power included in the report information. The type maximum value is the maximum value of the transmit power of the PUSCH that is to be set for each type of radio communication apparatus 20. The type maximum value is set for types of radio communication apparatuses 20 that can possibly execute communication in the sky.

Apparatus identification unit 240 identifies the type of radio communication apparatus 20. Apparatus identification unit 240 identifies whether or not radio communication apparatus 20 is radio communication apparatus 20 that can possibly execute communication in the sky. More specifically, apparatus identification unit 240 (i) performs identification with use of the IMEISV (International Mobile Equipment Identity Software Version) or contract type information of radio communication apparatus 20, (ii) performs identification based on separation of the connected APN (Access Point Name), and (iii) performs identification based on a measurement report from radio communication apparatus 20.

Communication quality measurement unit 250 measures the communication quality of radio communication apparatus 20. Specifically, communication quality measurement unit 250 measures the Reference Signal Received Power (RSRP) and the Reference Signal Received Quality (RSRQ) as the reception communication quality of reference signals (RS) transmitted by radio base stations 40. Communication quality measurement unit 250 also measures the path loss with respect to the downstream direction from radio base stations 40.

Power control unit 260 controls the transmit power of the physical uplink channel (PUSCH, PUCCH, or the like) used for transmission by radio signal transmission/reception unit 210. Specifically, power control unit 260 limits the transmit power if the interference levels or the communication qualities of cells acquired by communication state acquisition unit 220 are in a predetermined range (e.g., if the path loss of the physical downlink channel is less than or equal to a threshold value). Specifically, power control unit 260 limits the transmit power of the PUSCH to a threshold value or lower if the interference levels in cells are in a predetermined range (e.g., x dBm). For example, if the interference level in one cell is −80 dBm, the interference level in another cell is −85 dBm, and the predetermined range is 10 dBm, then power control unit 260 limits the transmit power of the PUSCH to the threshold value or lower. In the case of path loss as well, power control unit 260 limits the transmit power of the PUSCH to a threshold value or lower if path losses are similarly in a predetermined range (e.g., y dB).

Also, power control unit 260 receives "individual maximum value", which is the maximum value of the transmit power that is to be set in radio communication apparatus 20. The individual maximum value is the maximum value of the transmit power of the PUSCH that can be set for an individual radio communication apparatus 20. In other words, the individual maximum value is the maximum value of the transmit power of the PUSCH that is to be set individually for each radio communication apparatus 20. Power control unit 260 limits the transmit power based on the received individual maximum value.

Furthermore, power control unit 260 can limit the transmit power of the PUSCH based on the type maximum value included in the report information acquired by report information reception unit 230. Note that if both an individual maximum value and a type maximum value have been set, either one of them (e.g., the individual maximum value) may be applied with priority.

Power control unit 260 can determine whether or not to limit the transmit power of the PUSCH based on the reception communication quality measurement result obtained by communication quality measurement unit 250. Specifically, power control unit 260 can limit the transmit power if the RSRP is greater than or equal to a first threshold value, and the RSRQ is less than or equal to a second threshold value.

Power control unit 260 can also limit the transmit power if apparatus identification unit 240 has identified that radio communication apparatus 20 is provided in flight vehicle 10. In other words, if apparatus identification unit 240 has identified that radio communication apparatus 20 is provided in flight vehicle 10, power control unit 260 limits the transmit power even if the reception communication quality or the like does not satisfy the condition for limiting the transmit power.

Also, as shown in FIG. 9, radio base station 40 includes radio signal transmission/reception unit 410, maximum transmit power report unit 420, apparatus type determination unit 430, and interference level acquisition unit 440.

Radio signal transmission/reception unit 410 exchanges radio signals with radio communication apparatuses 20 and 30. Specifically, radio signal transmission/reception unit 410 transmits and receives signal waves on various types of physical channels (control channels and shared channels) in compliance with the LTE standard.

Maximum transmit power report unit 420 reports the above-described individual maximum value and type maximum value to radio communication apparatus 20. As previously described, the individual maximum value is the maximum value of the transmit power of the PUSCH that can be set for radio communication apparatus 20. Also, the type maximum value is the maximum value of the transmit power of the PUSCH that is to be set for each type of radio communication apparatus 20. Specifically, maximum transmit power report unit 420 can include the individual maximum value in an RRC message (e.g., RRC Connection setup or RRC Connection re-establishment setup) that is transmitted to radio communication apparatus 20. Maximum transmit power report unit 420 can also transmit report information that includes the type maximum value (e.g., an SIB). The SIB is reported to radio communication apparatus 20 with use of an RRC message.

Apparatus type determination unit 430 determines the type of radio communication apparatus 20 that has become connected to radio base station 40. Specifically, similarly to previously-described apparatus identification unit 240, apparatus type determination unit 430 can determine the type of radio communication apparatus 20 based on the IMEISV, contract type information, or the like of radio communication apparatus 20. Apparatus type determination unit 430 then notifies maximum transmit power report unit 420 of the result of determining the type of radio communication apparatus 20. Such information is used when setting the type maximum value.

Interference level acquisition unit 440 acquires the interference levels in a group of cells that includes its own cell, that is to say the interference levels in its own cell and neighboring cells. Specifically, interference level acquisition unit 440 periodically measures the interference power in the group of cells, and exchanges information indicating the neighboring cells and the interference levels thereof. Interference level acquisition unit 440 then notifies the acquired interference levels (interference powers) to maximum transmit power report unit 420. Such information is used when setting and changing the individual maximum value.

According to the above-described configuration, radio communication apparatus 20 limits the transmit power of the physical uplink channel, or more specifically the physical uplink shared channel (PUSCH). For example, in the case of using the interference level or the reception communication quality as the reference, radio communication apparatus 20 acquires the interference level (interference power) in a group of cells (its own cell and neighboring cells), or the reception communication quality (path loss) of radio communication apparatus 20 in the group of cells. Radio communication apparatus 20 then determines whether or not the interference levels or the reception communication qualities in the group of cells are in a predetermined range. Specifically, radio communication apparatus 20 determines whether or not the interference levels in the group of cells are in a predetermined range (e.g., x dBm), or whether the path losses in the group of cells are in a predetermined range (e.g., y dB). If the interference levels or the path losses in the group of cells are in the predetermined range, radio communication apparatus 20 calculates a limitation value for the transmit power of the PUSCH. Accordingly, radio communication apparatus 20 recognizes that it is a radio communication apparatus provided in flight vehicle 10. Note that the above-described individual maximum value or type maximum value can be used as the specific limitation value for the transmit power. Radio communication apparatus 20 then controls the transmit power based on the calculated limitation value. Accordingly, the transmit power of the physical uplink channel from radio communication apparatus 20 shown in FIG. 7 is suppressed, and as a result, the influence of interference waves on radio base stations 40b and 40c (FIGS. 4A and 4B) is suppressed.

The following describes an example of operations in the case of using the individual maximum value. Radio communication apparatus 20 receives an RRC message that include an individual maximum value from radio base station 40. Radio communication apparatus 20 can recognize whether it is a radio communication apparatus provided in flight vehicle 10 based on whether or not an individual maximum value for the PUSCH transmit power is included. Radio communication apparatus 20 calculates a limitation value for the PUSCH transmit power based on the received individual maximum value. Radio communication apparatus 20 then controls the transmit power based on the calculated limitation value. Specifically, radio communication apparatus 20 executes communication without exceeding a maximum transmit power that is defined based on the individual maximum value. Note that conceivable opportunities for notification of the individual maximum value include outbound communication from radio communication apparatus 20, inbound communication to radio communication apparatus 20, handover, reconnection, return to Non-DRX (Discontinuous Reception) state, and the point at which the above-described interference level exceeds a threshold value (point at which the individual maximum value will be set again), for example. Also, the individual maximum value can be notified with use of the above-described RRC Connection setup or RRC Connection Re-establishment setup, or also HO Command through the execution of an intra-cell handover (Intra-cell HO). Furthermore, the individual maximum value may be acquired from an external device by radio base station 40 via network 90, or may be directly acquired from an external device by radio communication apparatus 20. Also, the individual maximum value may be changed according to the path loss value of the physical downlink channel. For example, A dBm is used if path loss (dB) ≤X1, and B dBm is used if X1<path loss ≤X2. Alternatively, radio base station 40 may define the individual maximum value as A * path loss+B (where A and B are variables), and set A and B depending on the situation for example. Furthermore, in regards to the display format, the maximum transmit power value (e.g., 20 dBm) may be directly displayed as the individual maximum value, or a configuration is possible in which a default maximum transmit power value is defined in advance, and the difference from that maximum transmit power value is displayed as the individual maximum value (e.g., if the default is 23 dBm, and the maximum transmit power value is 20 dBm, then −3 dB is displayed).

The following describes an example of operations in the case of using the type of radio communication apparatus 20. If radio communication apparatus 20 is a radio communication apparatus 20 provided in flight vehicle 10, radio communication apparatus 20 receives report information (SIB or the like), and acquires a type maximum value for the PUSCH transmit power. Radio communication apparatus 20 calculates a limitation value for the PUSCH transmit power based on the received type maximum value. Radio communication apparatus 20 then controls the transmit power based on the calculated limitation value. Specifically, radio communication apparatus 20 executes communication without exceeding a maximum transmit power that is defined based on the type maximum value. Note that conceivable opportunities for changing the type maximum value include the report information transmission timing, and the point at which the above-described interference level exceeds a threshold value, for example. Multiple threshold values may be used for the interference level, and the type maximum value may be changed in accordance with an interference level value exchanged between neighboring cells. Furthermore, a configuration is possible in which the higher the interference level (interference power) is, the smaller the type maximum value is set. Similarly to the individual maximum value, the type maximum value may be acquired from an external device by radio base station 40 via network 90, or may be directly acquired from an external device by radio communication apparatus 20. Also, the identification of whether or not radio communication apparatus 20 is radio communication apparatus 20 provided in flight vehicle 10 may be standardized in 3GPP with use of the capability of the radio communication apparatus (UE). Furthermore, if the type maximum value is standardized, a fixed value may be set in radio communication apparatus 20 without using report information.

The following describes an example of operations in the case of using a measured quality as a reference. Radio communication apparatus 20 measures the reception communication quality of radio communication apparatus 20. Specifically, radio communication apparatus 20 measures the RSRP and the RSRQ. Also, radio communication apparatus 20 may acquire the path loss, the detected cell count, and the uplink PHR (Power Head Room). Radio communication apparatus 20 then calculates the limitation value for the PUSCH transmit power based on the measured reception communication quality. Radio communication apparatus 20 then controls the transmit power based on the calculated limitation value. In other words, radio communication apparatus 20 sets the maximum transmit power in accordance with the result of reception communication quality measurement. For example, radio communication apparatus 20 determines whether or not to limit the transmit power, based on the RSRP value and the RSRQ value. If the RSRP is greater than or equal to a first threshold value (TH1), and the RSRQ is less than or equal to a second threshold value (TH2), radio communication apparatus 20 limits the transmit power. This is because in the sky, there is a tendency for the RSRP to be high, and for the RSRQ to be low. Also, in the case of controlling the transmit power based on a measured quality reference, the transmit power is controlled in accordance with the reception communication quality, without the application of the above-described individual maximum value or type maximum value (note that the default maximum transmit power value is defined in 3GPP standards). Also, similarly to the individual maximum value, the maximum transmit power value may be changed according to the path loss value of the physical downlink channel. Note that radio communication apparatus 20 may notify radio base station 40 of the fact that radio communication apparatus 20 is limiting the transmit power in accordance with the reception communication quality. Also, even if radio communication apparatus 20 notifies radio base station 40 that transmit power limiting is being executed, radio base station 40 may instruct radio communication apparatus 20 to cancel such limiting.

Variation 3

A configuration is possible in which, in the case of a flight vehicle having a radio communication apparatus that does not need to perform communication using the physical uplink channel or flight vehicle 10 having a communication apparatus that does not perform communication via radio base station 40, instruction unit 52 does not give an instruction to maintain the distance specified by distance specification unit 51 when flying. For example, if flight vehicle 10 is a flight vehicle that includes a function for autonomously avoiding collisions, or it can be determined based on a flight history or the like that flight vehicle 10 can fly stably for example, then even if radio communication apparatus 20 of flight vehicle 10 suffers interference, that is sometimes not a big problem for the flight of flight vehicle 10 because flight control based on communication performed by radio communication apparatus 20 is not essential. In this way, if radio communication apparatus 20 of flight vehicle 10 has no need to perform communication using the physical uplink channel, instruction unit 52 does not give an instruction to maintain the distance specified by distance specification unit 51 when flying. Also, in the case of an airspace in which the communication apparatus of flight vehicle 10 can perform communication that does not involve the radio base station 40, such as Wifi (registered trademark), instruction unit 52 does not give an instruction to maintain the distance specified by distance specification unit 51 when flying. This is because the problem of interference will not occur if the radio communication apparatuses of multiple flight vehicles 10 use different communication channels.

Other Variations

The block diagrams used in the above description of the embodiments shows blocks in units of functions. These functional blocks (configuration units) are realized by any combination of hardware and/or software. Furthermore, there are no particular limitations on the means for realizing the functional blocks. In other words, the functional blocks may be realized by one physically and/or logically combined apparatus, or a plurality of physically and/or logically separated apparatuses that are connected directly and/or indirectly (for example, in a wired and/or wireless manner).

Although the LTE standard is described as an example in the above embodiment, the radio communication standard is not limited to this, and another standard such as 3G or 5G may be used. In other words, the aspects/embodiments described in the present description may be employed to a system that uses LTE(Long Term Evolution), LTE-A(LTE-Advanced), SUPER3G, IMT-Advanced, 4G, 5G, FRA(Future Radio Access), W-CDMA (registered trademark), GSM (registered trademark), CDMA2000, UMB (Ultra Mobile Broadband), IEEE 802.11 (Wi-Fi), IEEE 802.16 (WiMAX), IEEE 802.20, UWB (Ultra-WideBand), or Bluetooth (registered trademark), a system that uses another appropriate system, and/or a next-generation system that is an extension of any of the same.

The orders in the processing procedures, sequences, flowcharts, and the like of the aspects/embodiments described in the present description may be changed as long as no contradictions arise. For example, the methods explained in the present description show various step elements in an exemplified order, and are not limited to the specific order that is shown.

The aspects/embodiments described in the present description may also be used alone or in combination, or may also be switched when they are implemented. Furthermore, the notification of predetermined information (e.g., notification of "being X") is not limited to being performed explicitly, and may also be performed implicitly (for example, notification of the predetermined information is not performed).

The terms "system" and "network" used in the present description can be used in an interchangeable manner.

The information and the parameters described in the present description may also be expressed by absolute values, relative values with respect to a predetermined value, or another type of corresponding information. For example, a radio resource may also be one indicated by an index.

The names used for the above-described parameters are in no way limiting. Furthermore, there may be a case where formulae and the like using these parameters are different from those explicitly disclosed in the present description. Various channels (such as, for example, a PUCCH and a PDCCH) and information elements (such as, for example, a TPC) can be identified by any suitable name, and thus various names assigned to these various channels and information elements are no way limiting. For example, an example was described in which the function of the radio communication apparatus for controlling the transmit power is realized with use of an LTE channel, message, or parameter, but this function can be realized using a 3G or 5G equivalent channel, message, or parameter.

The term "determining" used in the present description may include various types of operations. The term "determining" can include a case where judging, calculating, computing, processing, deriving, investigating, looking up (for example, looking up a table, a data base, or another data structure), or ascertaining is regarded as "determining". Furthermore, the term "determining" can include a case where receiving (for example, receiving information), transmitting (for example, transmitting information), inputting, outputting, or accessing (for example, accessing data in the memory) is regarded as "determining". Furthermore, the term "determining" can include a case where resolving, selecting, choosing, establishing, or comparing is regarded as "determining". In other words, the term "determining" can include a case where some operation is regarded as "determining".

The present invention may be provided as a flight control method that includes the processing steps performed in flight control system 1 or flight vehicle management apparatus 50. Also, the present invention may be provided as a program for execution in flight vehicle 10 or flight vehicle management apparatus 50. This program may be provided in an aspect of being recorded on a recording medium such as an optical disk, or may be provided in an aspect of being downloaded to a computer via a network such as the Internet and being installed in the computer to become usable, for example.

Software, instructions, and the like may also be transmitted/received via a transmission medium. For example, if software is transmitted from a web site, a server, or another remote source using a wired technology such as a coaxial cable, an optical fiber cable, a twisted-pair wire, or a digital subscriber line (DSL), and/or a wireless technology using infrared light, radio waves, microwaves, or the like, the definition of the transmission medium will include the wired technology and/or the wireless technology.

Information, signals, and the like described in the present description may also be expressed using any of various different technologies. For example, data, an instruction, a command, information, a signal, a bit, a symbol, a chip, and the like that may be mentioned throughout the entire description above may also be expressed by an electric voltage, an electric current, an electromagnetic wave, a magnetic field or a magnetic particle, an optical field or a photon, or an arbitrary combination thereof.

Note that the terms described in the present description and/or the terms needed for understanding the present description may also be replaced by terms that have the same or similar meaning. For example, a channel and/or a symbol may also be a signal. Furthermore, a signal may also be a message. Furthermore, a component carrier (CC) may also be referred to as a carrier frequency, a cell, or the like.

All references to elements that have been given names such as "first" and "second" in the present description do not overall limit the number of such elements or the orders thereof. Such names may be used in the present description as a convenient method for distinguishing between two or more elements. Accordingly, references to first and second elements are not intended to mean that only two elements can be employed, or that the first element is required to come before the second element in some sort of manner.

The "means" in the configurations of the above-described apparatuses may be replaced by "unit", "circuit", "device", or the like.

The terms "including", "comprising", and other forms thereof are intended to be comprehensive as long as they are used in the present description or the claims, similar to the term "being provided with". Furthermore, the term "or" used in the present description or the claims is intended not to be exclusive OR.

In the entirety of the present disclosure, when articles are added through translation, for example, as "a", "an", and "the" in English, these articles also denote the plural form unless it is clear otherwise from the context.

While the present invention has been described in detail, it would be obvious to those skilled in the art that the present invention is not limited to the embodiments explained in the present description. The present invention can be implemented as corrected and modified aspects without departing from the spirit and scope of the present invention that are defined by the description of the claims. Accordingly, the present description aims to illustrate examples and is not intended to restrict the present invention in any way.

REFERENCE SIGNS LIST 1. flight control system
10. flight vehicle
20. radio communication apparatus
30. radio communication apparatus
40. radio base station
50. flight vehicle management apparatus
201. CPU
202. ROM
203. RAM
204. auxiliary storage apparatus
205. communication IF
51. distance specification unit
52. instruction unit
501. CPU
502. ROM
503. RAM
504. auxiliary storage apparatus
505. communication IF

What is claimed is:

1. A flight vehicle management apparatus comprising:
a processor configured to:
monitor a position of a first flight vehicle and a second flight vehicle in accordance with a flight plan for each of the first flight vehicle and the second flight vehicle;
calculate, for an airspace, an isolation distance between the position of the first flight vehicle having a first radio communication apparatus and the position of the second flight vehicle having a second radio communication apparatus, the second flight vehicle located in a cell formed by a radio base station, the isolation distance being calculated to be sufficient to suppress radio interference experienced between the second flight vehicle and the radio base station due to the first radio communication apparatus of the first flight vehicle and being calculated in accordance with a size of an area in which the second radio communication apparatus is connectable to the radio base station;
specify, for a first location, a first parameter regarding a communication quality of the first radio communication apparatus in the cell formed by the radio base station;
specify one or more radio base stations for which the first parameter is in a predetermined range at a certain location;
specify an interference radio base station that is, among the one or more specified radio base stations, a radio base station other than a radio base station that is connected to the first radio communication apparatus of the first flight vehicle that is flying above the certain location;
specify a second location at which the second radio communication apparatus is connectable to the specified interference radio base station;
calculate a distance above the certain location and between the second location, as the isolation distance between the first flight vehicle and the second flight vehicle;
wherein when the second location is a group of locations, the processor calculates, as the isolation distance, a longest or shortest distance above the certain location where the first flight vehicle flies and between the area in which the second radio communication apparatus is connectable to the interference radio base station; and
control the first flight vehicle and the second flight vehicle to maintain the isolation distance calculated for the airspace when flying in accordance with the flight plan.

2. The flight vehicle management apparatus according to claim 1,
wherein when the isolation distance between the first flight vehicle and the second flight vehicle is less than or equal to a threshold value, the processor is configured to not control the first flight vehicle and the second flight vehicle to maintain the isolation distance specified when flying.

3. The flight vehicle management apparatus according to claim 1,
wherein when the first flight vehicle is a flight vehicle having the first radio communication apparatus includes a function for avoiding interference with the radio base station, the processor is configured to not control the first flight vehicle and the second flight vehicle to maintain the isolation distance specified when flying.

4. The flight vehicle management apparatus according to claim 1,
wherein in a case of a flight vehicle having a radio communication apparatus that does not need to perform communication using a physical uplink channel or a flight vehicle having a communication apparatus that does not perform communication via the radio base station, the processor is configured to not control the first flight vehicle and the second flight vehicle to maintain the isolation distance specified when flying.

5. The flight vehicle management apparatus according to claim 1,
   the processor further configured to specify, as an interference radio base station, a second radio base station that is experiencing interference due to the first radio communication apparatus that is connected to the first radio base station at the first location.

6. The flight vehicle management apparatus according to claim 1,
   the processor further configured to specify a distance between the second location at which the second radio communication apparatus is connectable to the interference radio base station and the first location, as the isolation distance between the first vehicle and the second flight vehicle.

7. The flight vehicle management apparatus according to claim 1, wherein the first flight vehicle further includes a function for avoiding radio interference by limiting a transmit power of the first radio communication apparatus when the radio base station experiences radio interference from the first radio communication apparatus.

* * * * *